(12) United States Patent
Fischer et al.

(10) Patent No.: US 6,434,433 B1
(45) Date of Patent: Aug. 13, 2002

(54) EXTERNAL COMPONENTS FOR A MICROPROCESSOR SYSTEM FOR CONTROL OF PLURAL CONTROL ELEMENTS AND OPERATING METHOD

(75) Inventors: Werner Fischer, Heimsheim; Peter Grosshans, Hochdorf/enz; Mathias Kugel, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/346,595

(22) Filed: Jul. 2, 1999

(30) Foreign Application Priority Data

Jul. 7, 1998 (DE) .......................................... 198 30 472

(51) Int. Cl.⁷ .............................................. G05B 11/01
(52) U.S. Cl. ................................ 700/11; 700/7; 700/14; 700/19; 700/20; 700/2; 710/105; 710/110; 710/118; 710/126; 710/306; 713/501; 713/600; 340/310.02; 340/606; 340/611; 365/103; 365/230.03; 365/231; 711/122; 711/135; 711/143; 711/167
(58) Field of Search ........................... 700/2, 7, 11, 14, 700/19–20; 710/105, 110, 178, 126, 306; 713/501, 600; 340/310.02, 606, 611; 365/103, 230.03, 231; 711/122, 135, 143, 167

(56) References Cited

U.S. PATENT DOCUMENTS

| | | | |
|---|---|---|---|
| 3,898,623 A | 8/1975 | Cormier | 340/172.5 |
| 5,393,772 A * | 2/1995 | Senda et al. | 700/19 |
| 5,406,483 A * | 4/1995 | Kallis et al. | 701/53 |
| 5,517,626 A * | 5/1996 | Archer et al. | 710/110 |
| 5,737,563 A * | 4/1998 | Shigeeda | 711/5 |
| 5,811,962 A * | 9/1998 | Ceccherelli et al. | 323/282 |
| 5,943,507 A * | 8/1999 | Cornish et al. | 710/48 |
| 5,963,448 A * | 10/1999 | Flood et al. | 700/19 |
| 6,195,591 B1 * | 2/2001 | Nixon et al. | 700/19 |
| 6,304,511 B1 * | 10/2001 | Gans et al. | 365/233 |

FOREIGN PATENT DOCUMENTS

| | | |
|---|---|---|
| GB | 2 104 685 A | 3/1983 |
| GB | 2 159 987 A | 12/1985 |

* cited by examiner

Primary Examiner—Ramesh Patel
(74) Attorney, Agent, or Firm—Michael J. Striker

(57) ABSTRACT

The external intelligent component (3) connected with a microprocessor system (2) is described for essentially automatic control of a control element (1) without burdening the microprocessor system operation. The control parameters for the control element (1) are written into a data memory (6) of the external component (3) from the microprocessor system (2) and are read out internally from the data memory (6) during normal operation of the external component (3). Control of the external component (3) is possible by the microprocessor system (2) without blocking the system bus (5,7) of the microprocessor system (2) using a control line from the microprocessor to a reset input (RESET) of a controller (13) of the external component (3).

6 Claims, 2 Drawing Sheets

EXTERNAL COMPONENTS FOR A MICROPROCESSOR SYSTEM FOR CONTROL OF PLURAL CONTROL ELEMENTS AND OPERATING METHOD

BACKGROUND OF THE INVENTION

1. Field of the Invention

The present invention relates to an external component for a microprocessor system for a substantially automatic control of one or more control or adjusting elements without burdening the microprocessor system and to a method of operating this sort of external component.

2. Prior Art

It is known to control an electrical control element, such as a magnetic valve, with a microprocessor. The microprocessor transmits control commands according to a predetermined program to the control element via the system bus, which permits a very flexible control of the control element. It is disadvantageous however that the system bus of the microprocessor system is blocked during operation by the transmission of the control commands and thus is not available for other applications. This can lead to time delays when several control elements are under control of the microprocessor, because only one control element can be controlled at a time via the system bus of the microprocessor system.

Thus external intelligent components that can control the individual control elements largely automatically and thus cannot block the system bus of the microprocessor system are increasingly used for time-critical applications. The microprocessor transmits the information that is required for control of the control elements to the external components over the system bus prior to operation of the individual control elements. For example, in the case of a magnetic valve as control element the desired opening and closing times can be transmitted. During operation the control of the control element automatically occurs then according to the information transmitted from the microprocessor system. The system bus of the microprocessor system can then be used for other purposes. In this way it is also possible to control several control elements exactly at the same predetermined time.

The independence of the external intelligent components of course allows an improved control of the control elements, especially in time-critical applications, but this brings up the problem of control of these components by the microprocessor in reliability-critical applications. Thus an incorrect or erroneous operation by one control element cooperating with several control elements usually requires a suitable adjustment of the remaining control elements, which however is difficult because of the decentralized control of the control elements by the external components.

SUMMARY OF THE INVENTION

It is an object of the present invention to provide a method of control of several control elements of the above-described kind simultaneously, in which external components generally automatically control the respective control elements in order to reduce the load on the microprocessor system, however sufficient control of the control elements is possible for the purposes of establishing reliability.

It is especially an object of the present invention to provide external components for automatic operation of respective control elements by control commands from a microprocessor system that can be used in a system to provide more reliable control of the control elements.

According to the invention the external component for a microprocessor system for essentially automatic control of a control element without burdening the microprocessor system includes a data input for receiving a plurality of control parameters for the control element from the microprocessor system;

a data memory connected with the data input for storing the control parameters received from the microprocessor system for subsequent control of the control element;

a controller connected with the data memory for sequential read out of the control parameters stored in the data memory and for sequential control of the control element with the control parameters read out from the data memory;

wherein the controller has at least one control input for affecting read out of the control parameters and control of the control element, the at least one control input is connected with the microprocessor system or one or more additional components in order to facilitate control by the microprocessor system or the additional components.

According to the invention the method of operating the external component for a microprocessor system for substantially automatic control of a control element without burdening the microprocessor system includes the steps of:

a) transmitting a sequence of control parameters for the control element from the microprocessor system into the data memory of the external component;

b) reading out the control parameters from the data memory;

c) controlling the control element according to the control parameters read from the data memory; and d) transmitting a start signal from the microprocessor system to the external component to establish a safe or reliable state on failure of communication between the microprocessor system and the external components.

The invention includes the disclosure that control of a control element by the associated external component should start only when the microprocessor system transmits a suitable signal to the respective external components. On failure of communication between the microprocessor system and the external component this component is necessarily placed in a safe state. The control process can be started by transmission of a data word from the microprocessor system to the external component or by input of a binary signal.

In an advantageous embodiment of the invention the external component only begins to control of the control element when several control signals produced by the microprocessor system or by other additional external components take predetermined values. For example, it is thus possible that one external intelligent component stops the remaining external components when an incorrect operation of the associated control element is detected, in order to prevent operational difficulties. Also the individual components may be synchronized in this way since a fresh start of the control cycle stored in the external components is initiated when all control elements have finished their predetermined operating cycles and it signals the additional components by means of an appropriate control signal. The individual external components have veto power for control of the remaining external components. The control signals of the individual components are preferably combined by a logical gate. Combination with the control signal of the microprocessor system is also possible. Preferably an or-gate can be used so that each external component alone can block all other components.

The term 'control element' generally is understood to include all structural elements whose behavior can be directly or indirectly controlled by an electrically input variable.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
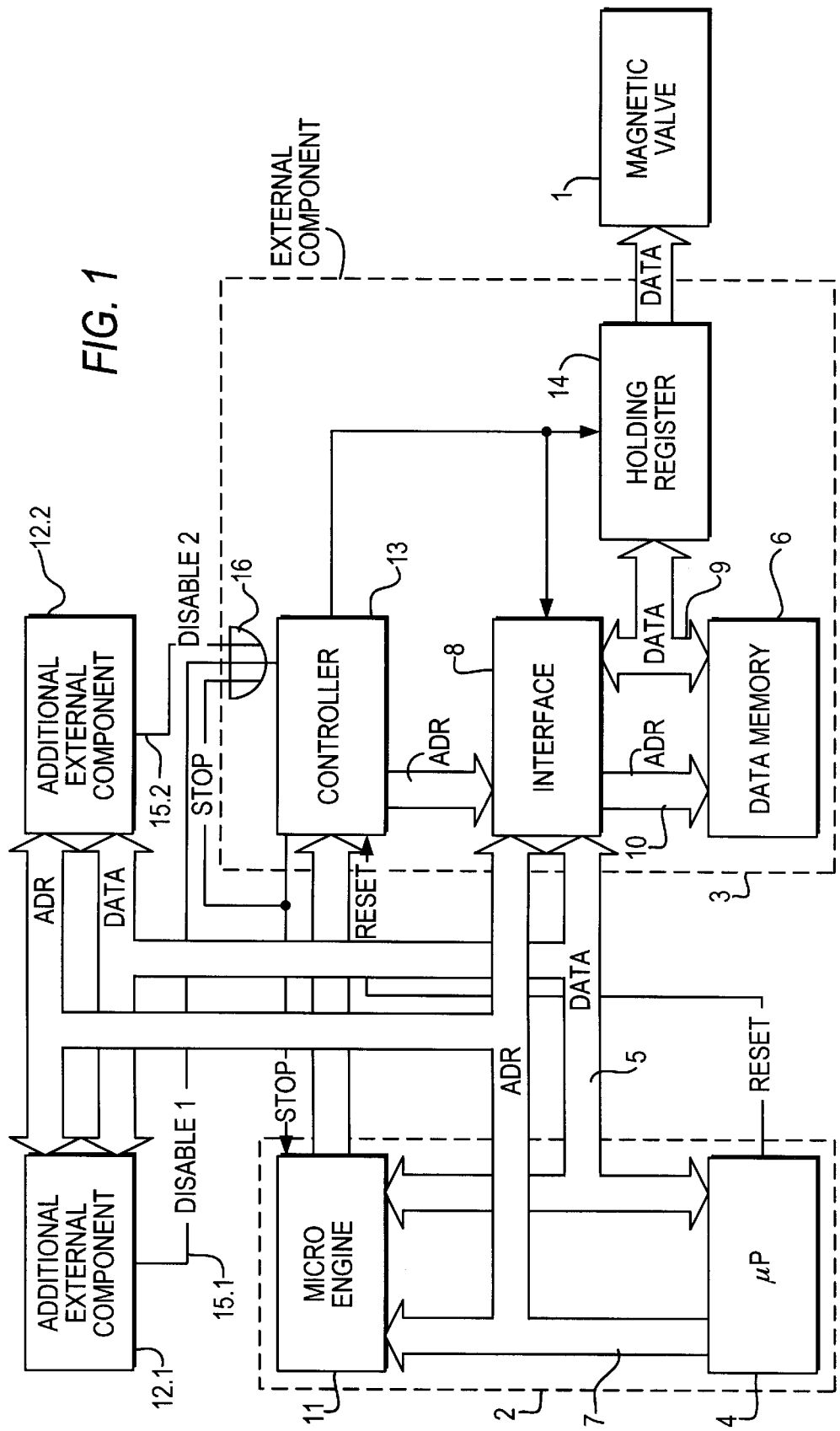
FIG. 1 is a block diagram of a preferred embodiment of the microprocessor system according to the invention with an external intelligent component for control of a magnetic valve.

The arrangement shown in FIG. 1 permits control of a magnetic valve 1 and comprises a microprocessor system 2 and an external intelligent component 3 which controls the magnetic valve 1 largely automatically in normal operation, without burdening the microprocessor system 2.

The manner in which the magnetic valve 1 is to be controlled, which occurs by providing the opening and closing times and the current strengths for control of the magnetic valve 1, must first be determined prior to operation of the arrangement. In the embodiment illustrated in FIG. 1 the appropriate control parameters are transmitted from a conventional microprocessor 4 to the external component 3 where they are stored in a predetermined sequence in a data memory 6 ('register file') via a data bus 5. The addressing of the data memory 6 occurs via an address bus 7 and an interface unit 8 is connected with the data memory 6. The interface unit 8 connects the data bus 5 and the address bus 7 of the microprocessor system with the internal data bus 9 and address bus 10 of the external component 3. After this step the data memory 6 of the external component 3 contains n control values, which form a control sequence for the magnetic valve 1.

Besides the microprocessor 4 the microprocessor system 2 has a so-called micro-engine 11 embodied as a simple computer. The micro-engine 11 controls the external component 3 during operation by means of control lines, whereby the address bus 7 and the data bus 5 remain free. As a result the address bus 7 and the data bus 5 can be used by the microprocessor 4 in order to communicate with two other components 12.1 and 12.2, which are shown only schematically in FIG. 1. The control of the external component 3 essentially occurs by means of a binary reset signal that is transmitted from the microprocessor 4 to the external component 3. The binary reset signal starts the control sequence previously stored in the data memory 6. However alternatively it is also possible to produce the reset signal by the micro-engine 11. The external component 3 has a controller 13 ('select register') which is connected with the microprocessor 4 by means of a control input for receiving the rest signal in order to start the control sequence. The interface 8, which separates the external address bus 5 and data bus 7 of the microprocessor system 2 from the internal address 9 and data bus 10, then controls the controller 13 after receiving the reset signal. As a result, the external component 3 does not act back on the address bus 5 and the data bus 7 and the microprocessor 4 can access the address bus 5 and the data bus 7 without interference. Instead the interface unit 8 connects the internal address bus 9 and/or the data bus 10 of the external component 3 with the controller 13 that addresses the individual control parameters in the data memory 6 via the internal address bus 10 one after the other. The control parameters are then sequentially input to the holding register 14, which is connected on its output side with the magnetic valve 1 and outputs the appropriate control parameters.

However prior to the start of the control sequence the external component 3 tests whether the other components 12.1 and 12.2 release the start of the control sequence. Both components 12.1 and 12.2 are connected by means of respective control lines 15.1 and 15.2 with an or-gate 16, that is connected on its output side to the controller 13. It is thus sufficient in order to prevent the start when one of the components 12.1 and 12.2 does not release the start of the next control sequence.

After reading the last control parameter of the predetermined control sequence the controller 13 sends a stop signal to the micro-engine 11. Then the microprocessor can start the next control sequence with a reset signal.

Figure 2:
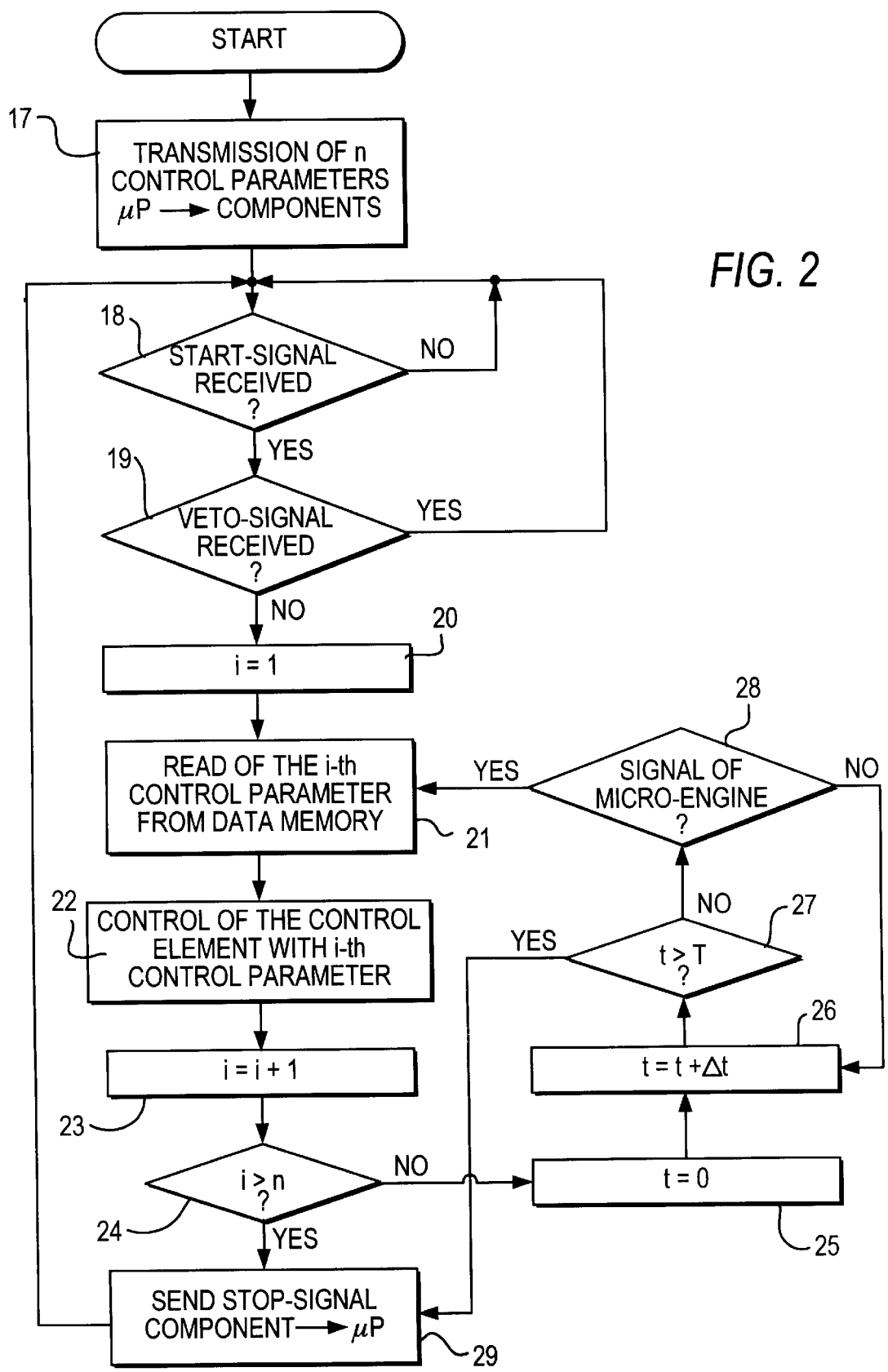
FIG. 2 is a flow chart for a method of operating the system shown in FIG. 1.

The flow chart shown in FIG. 2 illustrates a method of operation of the above-described system. In a first step 17 n control parameters of a control sequence are transmitted from the microprocessor 4 to the external component 3 and stored there in the data memory 6. In the next step 18 the external component 3 then tests whether or not the microprocessor 4 sends a reset signal. In this case the external component 3 in the next step 19 tests whether or not the other components 12.1 and 12.2 have sent a veto signal in order to prevent the start of the control sequence. These tests are repeated until a reset signal is sent to the microprocessor 4 and both components 12.1 and 12.2 release the start of the control sequence.

When these conditions are fulfilled, the address pointer i points to the first (i=1) control parameter of the control sequence in the next step 20.

Subsequently a loop consisting of several steps 21 to 29 is executed, in which first the i-th control parameter is read out from the data memory 6 and the magnetic valve 1 is controlled with the i-th control parameter. In the next step 23 the address pointer i is set on the next control parameter of the control sequence and whether or not the last control parameter of the control sequence has been read out or not is tested. In the following step 24 the address pointer i is compared with the number n of the control parameters.

The loop including steps 25 to 29 is repeated until either the micro-engine 11 outputs a signal for reading the next control value or until a predetermined time interval T has elapsed. Alternatively it is also possible that the control of the reading of the next control parameter occurs by means of a clock alone or by the microprocessor 4.

After output of the last control parameter of the control sequence the loop is then interrupted and a stop signal is sent out from the external component 3 to the micro-engine 11 so that the microprocessor 4 can start the control sequence anew by means of a reset signal.

The disclosure in German Patent Application 198 30 472.2 of Jul. 8, 1998 is incorporated here by reference. This German Patent Application describes the invention described above and claimed in the claims appended hereinbelow and provides the basis for a claim of priority for the instant invention under 35 U.S.C. 119.

While the invention has been illustrated and described as embodied in external components for a microprocessor system for control of plural control elements and operating method, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An external component (3) for a microprocessor system (2) for independent control of a control element (1) without burdening the microprocessor system (2), said external component (3) comprising:
    a data input (5) for receiving a plurality of control parameters for the control element (1) from the microprocessor system (2);
    a data memory (6) connected with the data input (5) for storing the control parameters received from the microprocessor system (2) for subsequent activation of the control element (1);
    a controller (13) connected with the data memory (6) for sequentially reading out the control parameters stored in the data memory (6) and for sequentially activating of the control element with the control parameters read out from the data memory (6);
    wherein the controller (13) has at least one control input for initiating read out of the control parameters and control of the control element (1), if a start signal from the microprocessor system or one or more additional components (12.1, 12.2), said at least one control input is connected with the microprocessor system (2) or said one or more additional components (12.1, 12.2) in order to facilitate control by the microprocessor system (2) or said additional components.

2. The external component (3) as defined in claim 1, wherein the at least one control input includes a reset signal input and said reset signal input (RESET) is connected with the microprocessor system (2) by means of a binary line.

3. The external component (3) as defined in claim 2, further comprising an or-gate (16) having an or-gate output and a plurality of or-gate inputs and wherein the at least one control input includes an additional control input connected to the or-gate output and the or-gate inputs are connected to the respective additional components or the microprocessor system.

4. The external component (3) as defined in claim 1, wherein the controller (13) has a control output (STOP) connected with the microprocessor system (2) in order to signal read out of a final one of the control parameters stored in the data memory (6).

5. A method of operating an external component for a microprocessor system (2) for independent control of a control element (1) without burdening the microprocessor system (2), wherein the external component comprises a data input (5) for receiving a plurality of control parameters for the control element (1) from the microprocessor system (2), a data memory (6) connected with the data input (5) for storing the control parameters received from the microprocessor system (2) for subsequent control of the control element (1) and a controller (13) connected with the data memory (6) for sequential read out of the control parameters stored in the data memory (6) and for sequential activation of the control element with the control parameters read out from the data memory (6); wherein the controller (13) has at least one control input for initiating read out of the control parameters and activation of the control element (1), said at least one control input is connected with the microprocessor system (2) or one or more additional components (12.1, 12.2) in order to facilitate control by the microprocessor system (2) or said additional components; said method comprising the steps of:
    a) transmitting a sequence of said control parameters for the control element (1) from the microprocessor system (2) into the data memory (6) of the external component (3);
    b) sequentially reading out said control parameters from the data memory (6);
    c) controlling the control element according to the control parameters read from the data memory (6), wherein the reading out of the control parameters and the activation of the control element by means of the control parameters read out is initiated only if the microprocessor system transmits a start signal to the external component (3); and
    d) transmitting a start signal from the microprocessor system (2) to the external component (3) to establish a safe or reliable state on failure of communication between the microprocessor system (2) and the external components (3).

6. The method as defined in claim 5, further comprising transmitting a control signal to the microprocessor system (3) from the external component (3) after read out of a last one of the control parameters from the data memory (6).

* * * * *